United States Patent
Baasch et al.

(10) Patent No.: US 6,725,737 B2
(45) Date of Patent: Apr. 27, 2004

(54) SHIFTING DEVICE FOR A TRANSMISSSION

(75) Inventors: Detlef Baasch, Friedrichshafen (DE); Ralf Dreibholz, Meckenbeuren (DE); Gerhard Gumpoltsberger, Friedrichshafen (DE)

(73) Assignee: ZF Friedrichshafen AG, Fridrichshafen (DE)

( * ) Notice: Subject to any disclaimer, the term of this patent is extended or adjusted under 35 U.S.C. 154(b) by 0 days.

(21) Appl. No.: 09/969,928

(22) Filed: Oct. 3, 2001

(65) Prior Publication Data

US 2002/0062706 A1 May 30, 2002

(30) Foreign Application Priority Data

Oct. 17, 2000 (DE) .......................... 100 51 373

(51) Int. Cl.[7] .......................... B60K 17/04; B60K 17/12
(52) U.S. Cl. .................. 74/473.12; 74/473.36; 74/473.37
(58) Field of Search .................. 74/473.12, 473.36, 74/473.37

(56) References Cited

U.S. PATENT DOCUMENTS

| | | | | |
|---|---|---|---|---|
| 4,428,248 A | * | 1/1984 | Brouscsou et al. | ............ 74/335 |
| 4,449,416 A | * | 5/1984 | Huitema | .................. 74/336 R |
| 5,724,856 A | * | 3/1998 | Back | ............................ 74/335 |
| 5,878,624 A | * | 3/1999 | Showalter et al. | ........ 74/473.37 |
| 6,286,381 B1 | * | 9/2001 | Reed et al. | ............... 74/336 R |
| 2003/0019312 A1 | * | 1/2003 | Gumpoltsberger et al. | ... 74/335 |

FOREIGN PATENT DOCUMENTS

| | | | |
|---|---|---|---|
| DE | 41 05 157 A1 | 1/1992 | ........... F16H/61/28 |
| DE | 199 11 274 A1 | 9/2000 | ........... F16H/63/16 |
| JP | 291796 A | * 10/2000 | |

* cited by examiner

Primary Examiner—David Fenstermacher

(57) ABSTRACT

A transmission shifting device (1) is described which has one shifting element (3) rotatably guided upon an axle (2) and provided with at least one grooved path (4). The grooved path (4) engages at least one shift fork (5) which upon rotation of the shifting element (3) can be moved accordingly axially by the shape of the grooved path (4). Rotation of the shifting element (3) is possible via an electromotor (8) in operative connection with the shifting element (3) and having one stator (9) and one rotor (10). According to the invention, the stator (9) and the rotor (10) are situated at least partly between the shifting element (3) and the component part (2) without a housing of their own.

20 Claims, 2 Drawing Sheets

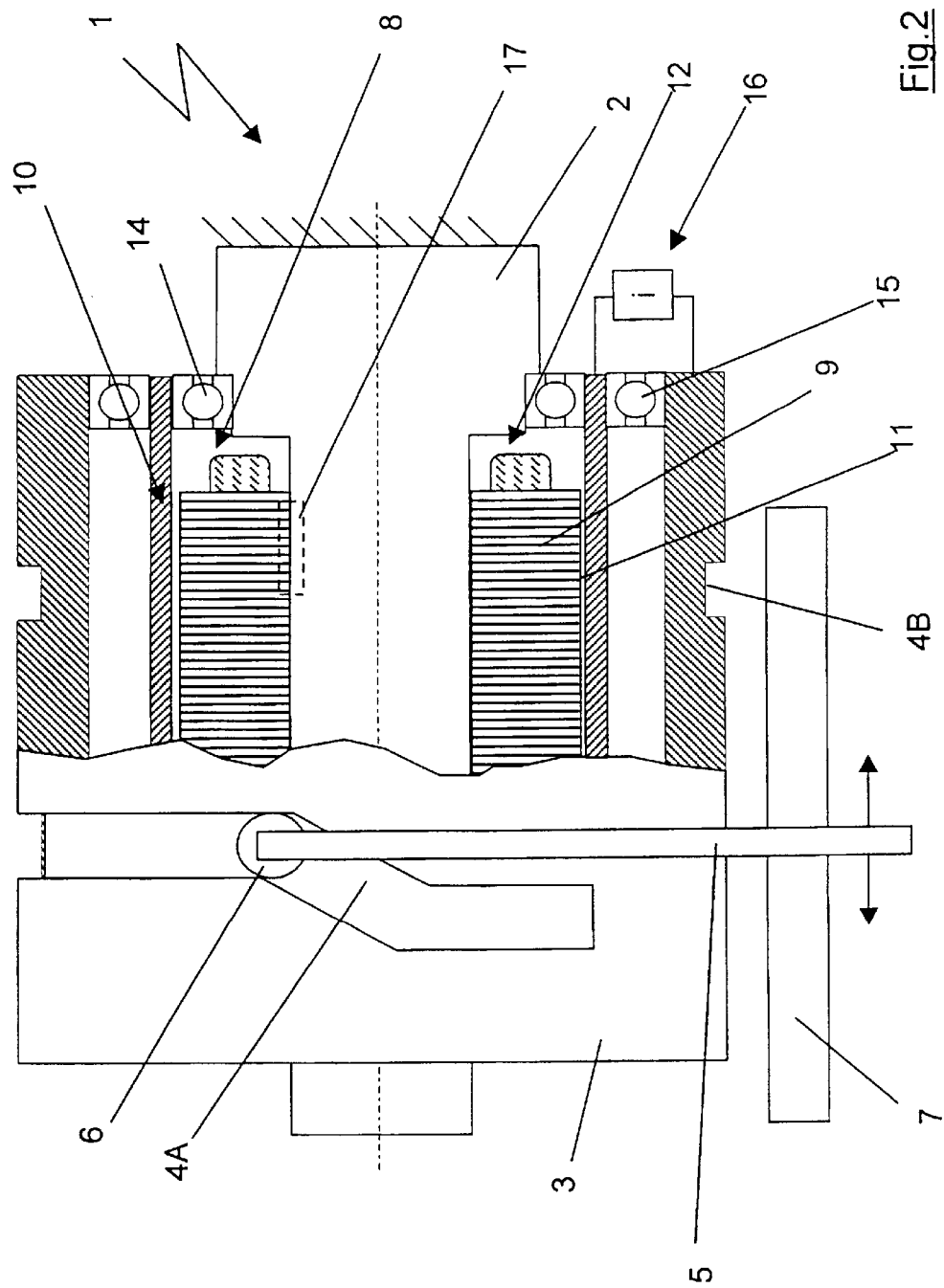

SHIFTING DEVICE FOR A TRANSMISSSION

FIELD OF THE INVENTION

The invention concerns a shifting device of a transmission.

BACKGROUND OF THE INVENTION

Shiftings of a transmission to change the ratio thereof are carried out in practice in order to convert the engine rotational speed or the engine torque abutting on the transmission input into rotational speed or torque on output wheels of a vehicle which correspond to a desired speed of the vehicle under sufficient input torques or tractional forces.

For a change of ratio, for example, a shifting device is provided in the practice which has a shifting element rotatably guided upon a component part and known also by the designation of drum selector gear. The drum selector gear, known per se, is usually provided with at least one grooved path in which at least one shift fork engages. Upon rotation of the shifting element, the shift fork is moved axially along a shift fork guide by a defined shape of the grooved path. To carry out a gear shift, the drum selector gear is turned either manually by the driver, via a shift lever, or actuated by outside force via a drive mechanism.

It is known from the prior art, for example, to use an electromotor as a drive system for outside-force actuation of the drum selector gear which is situated in the transmission in the area of the drum selector gear often parallel thereto. Between the electromotor and the drum selector gear, for example, a reduction step is provided by which a rotary motion of the electromotor is transmitted to the drum selector gear for an axial adjustment of the shift fork.

The shifting devices, known from the practice, however, have the disadvantage that the use of an electromotor for actuating a drum selector gear requires a large installation space in a transmission, which stands opposed to the general requirements presently existing for assemblies of a vehicle such as a reduction in the dimensions and a reduction in weight of the component parts.

The need for a large space for the described shifting device results from the fact that a drum selector gear must have a large diameter to ensure its functionality, particularly when coupling several shift forks. The large diameter is due to the fact that for the different shift forks coupled, longer grooved paths have to be provided in order to be able to operate or actuate them all separately, the drum selector gear being allowed to perform at most one revolution. Since the electromotor is separately designed with a housing and placed in the area of the drum selector gear, added space is a need in the transmission for driving the drum selector gear which generally is not available or leads to an enlargement of the dimensions and an increase of the weight of the transmission.

Therefore, the problem on which this invention is based is to make a shifting device of a transmission available which requires only a small space in the transmission.

According to the invention this problem is solved by a shifting device of a transmission having the features of claim 1.

SUMMARY OF THE INVENTION

With the inventive shifting device of a transmission, the space requirement is considerably reduced since the stator and the rotor of the electromotor, serving as an input of the grooved shifting element, is conveniently placed at least partly between the shifting element and the component part without a housing of its own. With this configuration of the inventive shifting device in which, contrary to a conventional shifting element, the external dimensions do not have to be changed at all or only insignificantly by integration of an electrical drive of the shifting device in the area between the shifting element and the axle associated therewith, the needed space is reduced.

It is a further advantage that the stator-rotor unit of the electrical drive of the shifting device, situated in the transmission without a housing of its own, makes it possible to spare component parts which results in a reduction in weight of the transmission.

The inventive solution conveniently does not require a complete new construction of the driving aggregate or of the transmission since the electric machine can also be integrated without problem, e.g. in a sealed, oil-containing area of currently available types of transmission.

BRIEF DESCRIPTION OF THE DRAWINGS

The invention will now be described, by way of example, with reference to the accompanying drawings in which:

FIG. 2 is one other design of the shifting device of FIG. 1 wherein the shifting element and the rotor are designed as two separate parts and a step-up transmission is provided therebetween for transmitting rotational motion.

DETAILED DESCRIPTION OF THE INVENTION

Figure 1:
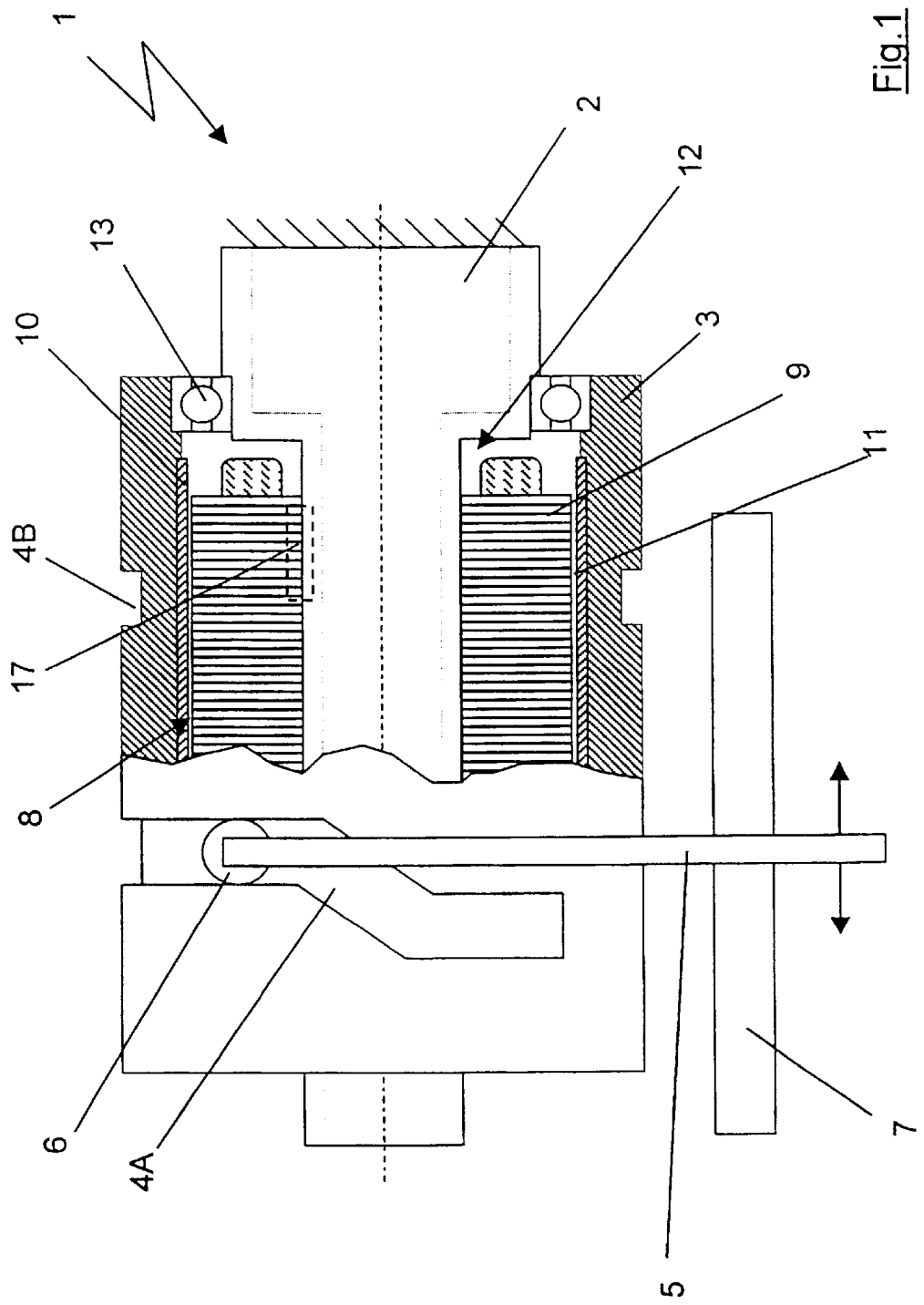
FIG. 1 is a shifting device of a transmission of a motor vehicle with an electromotor integrated between a shifting element and an axle.

In FIG. 1 is shown a shifting device 1 of a transmission of a motor vehicle having a rotatably guided shifting element 3 upon an axle 2 of the shifting device 1. The shifting element 3 is provided, in this embodiment, with two grooved paths 4A, 4B in each of which a shift fork 5 engages, only one shift fork being shown in FIG. 1. It obviously is, at an expert's discretion, to design the shifting element 3 for a transmission with more than two grooved paths in accordance with the utilization in point.

The shift fork 5 engages, via a guide pin or a guide roller 6, in the grooved path 4A and in its end remote from the guide pin 6 is guided via a shift fork guide 7 and movably supported in an axial direction. Upon rotation of the shifting element designed as a tubular drum selector gear 3, the shift fork 5 is accordingly moved by the shape of the grooved path 4 axially along the shift fork guide 7.

Rotation of the drum selector gear 3 is achieved via an electromotor 8 which is in operative connection with the drum selector gear and comprises a stator 9 and a rotor 10. The electromotor 8 of the stator-rotor unit is situated without a housing of its own between the drum selector gear 3 and the axle 2 which is designed fixed to the transmission housing.

In the embodiment of the shifting device 1 shown in FIG. 1, the rotor 10 with the drum selector gear 3 forms a structural unit such that rotational movement of the rotor 10 is transmitted directly to the drum selector gear 3.

At the same time, the rotor 10 is formed by permanent magnets which are adhered to the drum selector gear 3 provided as a support for the permanent magnets. At an expert's discretion, it is obvious to connect the rotor 10 or the permanent magnets with the drum selector gear 3 by means of another type of connection suited to the utilization in point.

The rotor 10, with its entire cross-section, is formed into a magnetically active flow-guiding structural part without a laminated magnet plate or a typical electromotor material being needed for this.

Diverging from the embodiment shown in FIG. 1, the drum selector gear obviously can also itself be designed as a permanent magnet or be constructed from such a material so that an additional finishing step during production of the shifting device is eliminated, since fastening of the permanent magnets on the drum selector gear is omitted. With this development, a further reduction in the weight of the transmission is obtained in which the rotor forms, at the same time, the drum selector gear.

In the embodiment of FIG. 1, the stator 9 is designed as a separate part, but in an alternative design, can also be made integral with the axle 2, comprises as active elements a coil end and an iron yoke and has a symmetrical geometry with a substantially rectangular cross-section. Its outer outline has an essentially cylindrical shape and is adapted to the rotor 10 of the electromotor 8 that surrounds it. An air gap 11 is further provided which extends parallel to a central axis of the axle 2, between the rotor 10 and the stator 9.

For further reducing the space requirement of the shifting device 1, the stator 9 is situated in a recess 12 of the axle 2, and a non-rotatable connection 17 is provided between the axle 2 and the stator 9 in the area of the recess 12.

In this embodiment, the non-rotatable connection 17 is designed as a spring-groove connection, of course, it being possible to design the non-rotatable connection between the stator 9 and the axle 2 by another type of connection such as force fit or adhering.

The recess 12 on the axle 2, where the stator 9 is placed, is designed in the axle as an annular recess extending over the periphery of the axle 2 whereby the stator 9 can be dimensioned larger without requiring an altogether greater installation space of the shifting device.

The drum selector gear 3 is rotatably supported upon the axle 2, via a grooved ball bearing 13, so that the drum selector gear 3, on one hand, can perform rotary movement around its axis of rotation without, or only with small bearing friction losses. On the other hand, the axial forces acting upon the drum selector gear 3, during a gear shift due to an axial adjustment of the shift fork 5, can be easily transmitted to the axle 2.

As shown in FIG. 2, the rotor 10 and the drum selector gear 3 are designed as two separate parts which are rotatably supported or guided upon the axle 2. The support of the rotor 10 is formed by a grooved ball bearing 14 situated between the rotor 10 and the axle 3. The drum selector gear 3 is likewise rotatably supported upon the axle 2, within another grooved ball bearing 15 situated between the rotor 10 and the drum selector gear 3 being provided for this.

To transmit rotary motion of the rotor 10 to the drum selector gear 3, a step-up gear 16 is intercalated as a connection between the drum selector gear 3 and the rotor 10. The step-up gear 16 is not shown in detail in this embodiment and can be designed as a space-favorable planetary transmission, as a simple step-up gear developed via two toothed wheels of different size, or in any other suitable manner.

The configuration or dimension of the rotor 10 and of the stator 9 are provided in a manner such that the forces required in the utilization in point, which forces are needed for rotational movement of the drum selector gear 3, are applied by the electromotor 8 situated between the drum selector gear 3 and the axle 2.

The electromotor can be designed as a direct-current motor or as an alternative-current motor, the selection depending on the utilization in point. The rotor can be designed depending on a direction of rotation or independent of the direction of rotation, the same as is coupled to the drum selector gear directly and/or via mechanical ratios.

Besides the rotor, as shown, can be configured as an outer rotor or as an inner rotor. In the latter case, the stator can leave the area between the drum selector gear and the axle to form a connection with a stationary part.

In the embodiments shown, the drum selector gear 3 represents a tubular body which already makes clear that the expression "drum selector gear" is not to be geometrically understood, since not only cylindrical bodies are comprised thereby. Rather, the expression "drum selector gear" is to be understood functionally with regard to the rotation of the body it designates which can have different external and internal outlines.

What is claimed is:

1. A shifting device for a transmission comprising:
    a shifting element (3) rotatably guided upon an axle (2) and provided with at least one grooved path (4A, 4B);
        wherein a shift fork (6, 7) engages with the at least one grooved path (4A, 4B) during rotation of the shifting element (3) and the at least one shift fork (6, 7) is accordingly axially movable by a shape of the grooved path (4A, 4B);
    the shifting element (3) being rotated by an electromotor (8) which is operatively connected with the shifting element (3);
    a stator (9) and a rotor (10) of the electromotor (8) are situated between with the shifting element (3) and the axle (2) so that the stator (9) and the rotor (10) are at least partially enclosed by the shifting element (3) and are thereby housed within the shifting element (3).

2. The shifting device according to claim 1, wherein the rotor (10) and the shifting element (3) are two separate components which are both rotatably guided upon the same axle (2).

3. The shifting device according to claim 1, wherein a step-up gear (16) is rotatably connected between the shifting element (3) and the rotor (10) for transmitting rotary motion of the rotor (10) to the shifting element (3), and the step up gear (16) is one of a planetary transmission gear and two engaged gear wheels of different sizes.

4. The shifting device according to claim 1, wherein the rotor (10) and the shifting element (3) form a structural unit, and rotary motion of the rotor (10) is directly transmitted to the shifting element (3).

5. The shifting device according to claim 4, wherein the rotor (10) is rotatably guided around the axle (2) via the shifting element (3).

6. The shifting device according to claim 1, wherein the stator (9) is situated on the axle (2) and a non-rotatable connection (17) is provided between the stator (9) and the axle (2).

7. The shifting device according to claim 6, wherein the axle (2) is provided with a recess (12) which extends at least sectionally over a periphery of the axle (2), and the stator (9) is at least partly situated within the recess (12) of the axle (2).

8. The shifting device according to claim 1, wherein the shifting element is a tubular drum selector gear (3).

9. A shifting device of a transmission comprising:
    a shifting element (3) coaxially and rotatably mounted about an axle (2) of the transmission;

the shifting element (3) including at least one grooved path (4A, 4B) engaging and actuating a transmission shift fork (6, 7) upon rotation of the shifting element (3);

an electromotor (8) having a stator (9) and a rotor (10) mounted concentrically mounted between the axle (2) and the shifting element (3):

the stator (9) being mounted coaxially and concentrically around the axle (2);

the rotor (10) being mounted coaxially, concentrically and rotatably around the stator (9) to rotate about the stator (9) and the axle (2); and the shifting element (3) being mounted coaxially and concentrically around the rotor (10) and connected to the rotor (10) so that as the rotor (10) rotates the shifting element (3) rotates to thereby actuates the shift fork (6, 7).

10. The shifting device according to claim 9, wherein the rotor (100) and the shifting element (3) are two separate components which are both rotatably guided upon the same axle (2).

11. The shifting device according to claim 9, wherein a step-up gear (16) is rotatably connected between the shifting element (3) and the rotor (10) for transmitting rotary motion of the rotor (10) to the shifting element (3), and the step up gear (16) is one of a planetary transmission gear and two engaged gear wheels of different sizes.

12. The shifting device according to claim 9, wherein the rotor (10) and the shifting element (3) form a structural unit, and rotary motion of the rotor (10) is directly transmitted to the shifting element (3).

13. The shifting device according to claim 12, wherein the rotor (10) is rotatably guided around the axle (2) via the shifting element (3).

14. The shifting device according to claim 9, wherein the stator (9) is situated on the axle (2) and a non-rotatable connection (17) is provided between the stator (9) and the axle (2).

15. The shifting device according to claim 14, wherein the axle (2) is provided with a recess (12) which extends at least sectionally over a periphery of the axle (2), and the stator (9) is at least partly situated within the recess (12) of the axle (2).

16. The shifting device according to claim 9, wherein the shifting element is a tubular drum selector gear (3).

17. A shifting device for a transmission comprising:

a shifting element (3) rotatably guided upon an axle (2) and provided with at least one grooved path (4A, 4B);

wherein a shift fork (6, 7) engages with the at least one grooved path (4A, 4B) during rotation of the shifting element (3) and the at least one shift fork (6, 7) is accordingly axially movable by a shape of the grooved path (4A, 4B);

an electromotor (8) is operatively connected with the shifting element (3) for rotating the shifting element (3);

the electromotor (8) includes a stator (9) and a rotor (10) which are both situated between with the shifting element (3) and the axle (2) so that the stator (9) and the rotor (10) are at least partially enclosed by and housed within the shifting element (3).

18. The shifting device according to claim 17, wherein the rotor (10) and the shifting element (3) are two separate components which are both rotatably guided upon the same axle (2).

19. The shifting device according to claim 17, wherein a step-up gear (16) is rotatably connected between the shifting element (3) and the rotor (10) for transmitting rotary motion of the rotor (10) to the shifting element (3), and the step up gear (16) is one of a planetary transmission gear and two engaged gear wheels of different sizes.

20. The shifting device according to claim 17, wherein the rotor (10) and the shifting element (3) form a structural unit, and rotary motion of the rotor (10) is directly transmitted to the shifting element (3).

* * * * *